UNITED STATES PATENT OFFICE.

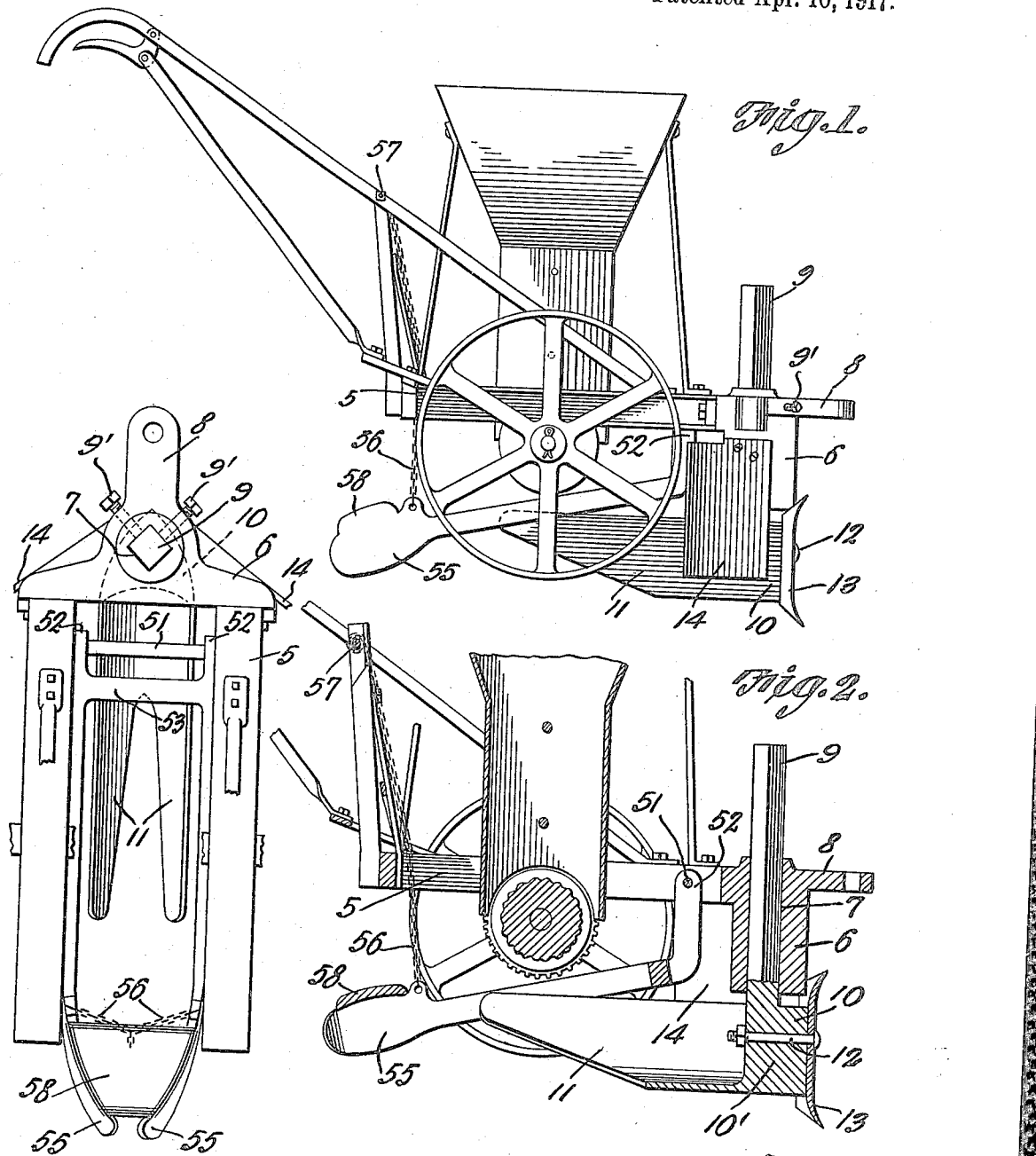

JOHN A. GARDNER, OF GRIFTON, NORTH CAROLINA.

UNIVERSAL SEED-PLANTER.

1,222,386.

Specification of Letters Patent.

Patented Apr. 10, 1917.

Original application filed August 8, 1916, Serial No. 113,712. Divided and this application filed October 17, 1916. Serial No. 126,116.

*To all whom it may concern:*

Be it known that I, JOHN A. GARDNER, a citizen of the United States, residing at Grifton, in the county of Pitt and State of North Carolina, have invented certain new and useful Improvements in Universal Seed-Planters, of which the following is a specification, reference being had therein to the accompanying drawing.

My present invention relates to improvements in universal seed planters, the present application being a division of my application filed August 8, 1916, serial No. 113,712, one object of the invention being the provision of a novel construction and arrangement of furrow opener in which the earth to receive the seed is properly furrowed and the seed distributed between a novel form of distributing shoe, there being further provided a novel construction of covering mechanism which is provided with a hood to displace the employment of a packing roller, in that the hood itself acts to pack the earth upon the covered seed, the same being adjustable to vary the pressure exerted for the various characters of seed planted.

In the accompanying drawings:

Figure 1 is a side elevation of the complete planter.

Fig. 2 is an enlarged longitudinal sectional view thereof.

Fig. 3 is a top plan view of the frame of the planter with the distributing member and hopper removed to more clearly show the furrow opener and covering mechanism.

Referring to the drawings, the numeral 5 designates the frame of the present planter which has secured to the forward end thereof a casing 6 provided with a square bore 7 and the clevis receiving lug 8.

The square shank 9 is vertically adjustable in the bore 7 to be held in any desired adjustment by means of the set screw 9', the integral end 10 thereof forming the shoe 10' for the lateral furrow forming blades 11 which permit the direction of the seed therebetween.

A bolt 12 attaches the earth cutting member 13 to the forward end of the member 10, while secured to the member 6 and extending in opposite directions are the guards 14 which prevent weeds or stubble from interfering with the operation of the seed disposition.

The rod 51 mounted at the lower end of the frame 5 has swingingly connected thereto the apertured lugs 52 which are fast by means of the integral cross bar 53 so that the arms 54 will properly carry the covering blades or shovels 55 which are suspended through the instrumentality of the chain 56 whose upper end is adapted to be connected by any desired means to the cross-bar 57 of the handle 31. The hood 58 is formed integral with the upper edge of the shovels 55 and is so shaped and constructed as to act as an earth packer so that when the shovels cause the earth to cover the seed the hood 58 will bear down upon such loose earth and pack the same to properly roll the earth and thus thoroughly cover the seed, this hood dispensing with the use of any additional covering rolls as is the usual practice.

What I claim as new is:

1. A universal seed planter, including a combined furrow opener and seed distributer adjustably supported by the frame and having a relatively heavy portion terminating in an angular trough, the rear portion of the bottom of which is cut away to provide two seed directing wings, and a removable furrow forming blade detachably connected to the heavy portion at the opposite side to the wings.

2. A universal seed planter, including a frame, a casting mounted at the forward end thereof and provided with an irregular bore, an irregular shank mounted therein for vertical adjustment and having formed integral with the lower end thereof a relatively heavy portion terminating in an angular trough, the bottom of which is cut away to provide seed directing wings, a seed distributing member mounted in the frame and emptying between said wings, and a manually adjustable covering member consisting of an integral pair of arms having apertured hanging lugs and covering blades.

3. The combination in a universal seed planter of a frame, a furrow forming member adjustably mounted on the front end thereof and having rearwardly extending spaced seed distributing wings, a rod mounted transversely on the frame, a combined covering and earth packing member swingingly connected to said rod, the latter including two arms having substantially L-shaped terminals journaled upon the rod, a covering blade formed at the free terminal of each arm, and an earth packing member constituting a hood connected to the upper edges of the blade and spanning the space therebetween.

In testimony whereof I affix my signature.

JOHN A. GARDNER.